(No Model.)
P. STEINMETZ & J. GEISINGER.
BUSH FOR VERTICAL SHAFTS.
No. 275,867. Patented Apr. 17, 1883.
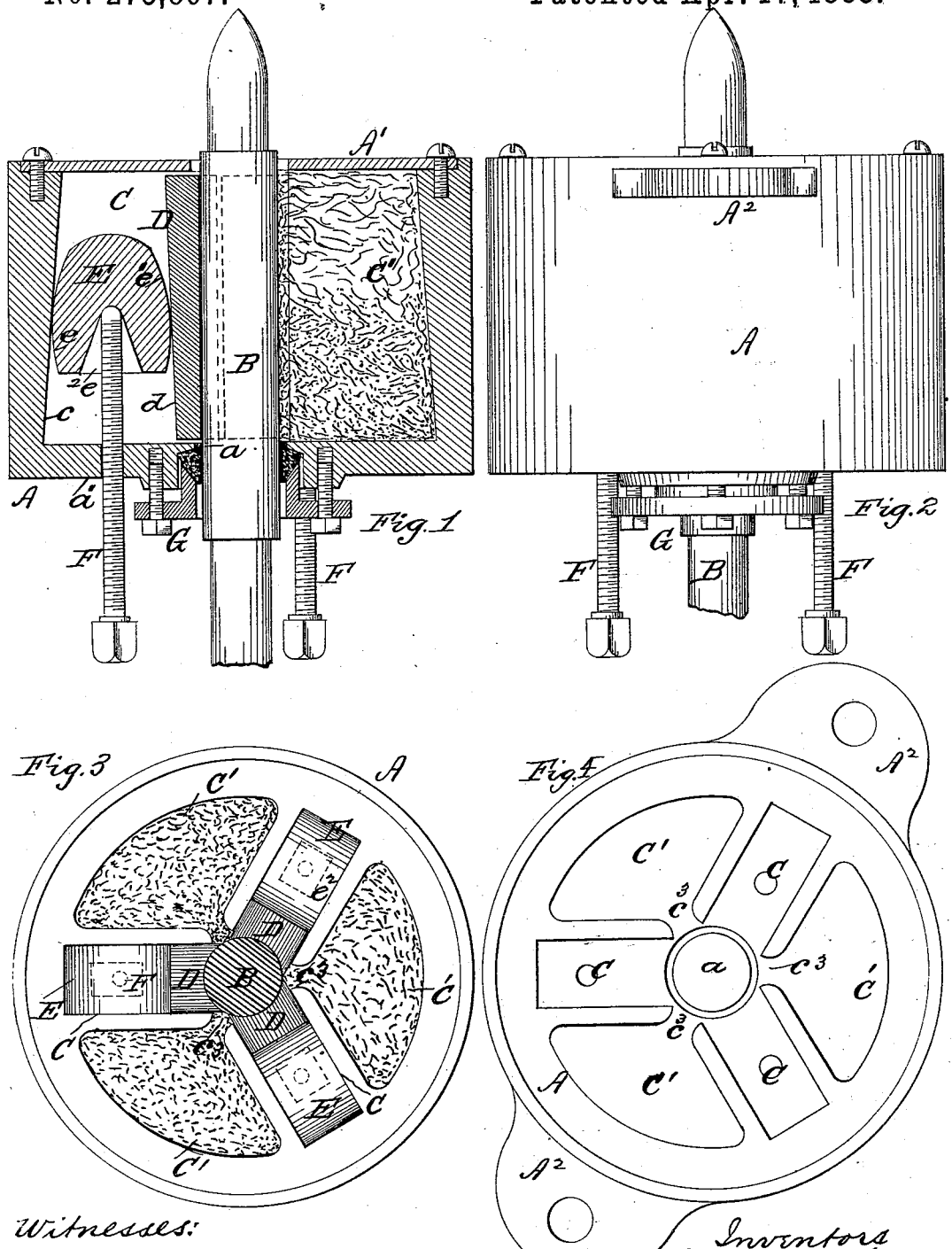

UNITED STATES PATENT OFFICE.

PHILIPP STEINMETZ AND JOHN GEISINGER, OF PHILADELPHIA, PA.

BUSH FOR VERTICAL SHAFTS.

SPECIFICATION forming part of Letters Patent No. 275,867, dated April 17, 1883.

Application filed May 15, 1882. (No model.)

*To all whom it may concern:*

Be it known that we, PHILIPP STEINMETZ and JOHN GEISINGER, citizens of the United States, residing at Philadelphia, in the county of Philadelphia and State of Pennsylvania, have invented certain new and useful Improvements in Bushes for Vertical Shafts, of which the following is a specification, reference being had therein to the accompanying drawings, wherein—

Figure 1 is a vertical transverse section of our improved bush. Fig. 2 is an elevation of same. Fig. 3 is a plan, partly sectional, with top plate removed; and Fig. 4 is a plan of the frame or box of the bush.

Our invention has relation to bushes for vertical shafts, and is especially adapted for mill-spindles.

It has for its object to provide a bush wherein the followers are so arranged within the bush that they are free to move laterally or adjust themselves to the shaft or spindle, and thereby form a self-adjusting bush.

Our invention has for its further object to provide a self-oiling bush.

Our invention accordingly consists of the novel combination, construction, and arrangement of parts, as hereinafter more specifically described and claimed.

Referring to the accompanying drawings, A represents the bush box or case, which may be circular in outline or of any other suitable shape, having a central aperture, $a$, for the shaft or spindle B.

C C' represent two sets of chambers formed in said bush, surrounding the opening $a$. The chambers C C C are oblong in outline, as shown, and have rear inclined sides, $c$. In said chambers are placed the loose followers D D D, the rear sides of which are inclined, as shown at $d$, Fig. 1.

E E E represent bearings for said followers, and are formed with curved or convexed sides $e\ e'$ which respectively rest or bear against the inclined sides $c\ d$ of the bush and followers. Said bearings are held in position and vertically adjusted to take up the wear of the followers by means of the screws F F, which pass through the bottom $a'$ of bush A, and enter openings or recesses $e^2$ in said bearings. By turning the screws F F the bearings E E are raised in the chambers C C, whereupon, owing to the inclination of the sides $c\ d$, the followers D D are caused to hug the spindle B and form a bearing therefor, while the rounded or curved sides $e'$ of bearings E form pivotal points for the followers D D to rock upon, in order that they may automatically adjust themselves to any lateral movement of the spindle B. The chambers C' C' C' are segmental in outline, and have vertical central openings or lines of perforations, $c^3\ c^3$, through which oil or other lubricant contained in said chambers finds its way to shaft B.

G is a stuffing-box upon the bottom $a'$ of the bush, as shown in Figs. 1 and 2, for preventing leakage of oil from chambers C'; and A' is a cap or cover for the bush, screwed or otherwise suitably fastened thereto.

If the bush is designed to be applied to mill-spindles, it may be formed with lugs $A^2\ A^2$ for securing it to the millstone; or the bush may be wedged to the stone in the usual manner.

If desired, the chambers C' C' may be filled with waste and oil, tallow, lard, or other lubricant.

What we claim as our invention is—

1. A bush or bearing provided with two series of chambers, one series containing the followers and their interposed bearings, and the other being adapted and designed to hold a lubricant, said bush having a stuffing-box applied thereto, substantially as shown and described.

2. A bush or bearing, A, having inclined side $c$, the followers D D, interposed bearings E E, having curved or rounded sides $e\ e'$, recess $e^2$, and the adjusting-screws F, substantially as shown and described.

In testimony whereof we affix our signatures in presence of two witnesses.

PHILIPP STEINMETZ.
JOHN GEISINGER.

Witnesses:
S. J. VAN STAVOREN,
CHAS. F. VAN HORN.